United States Patent
Ahmadloo et al.

(10) Patent No.: US 12,415,935 B2
(45) Date of Patent: Sep. 16, 2025

(54) STORAGE STABLE PCM CONTAINING AQUEOUS COOL COATINGS FOR FLEXIBLE FOAMS

(71) Applicant: Dow Global Technologies LLC, Midland, MI (US)

(72) Inventors: Hamideh Ahmadloo, Horgen (CH); Jouko Vyorykka, Waedenswil (CH); Anja Arlt, Horgen (CH); Paul A. Cookson, Schindellegi (CH); Ricco Borella, Horgen (CH)

(73) Assignee: Dow Global Technologies LLC, Midland, MI (US)

(*) Notice: Subject to any disclaimer, the term of this patent is extended or adjusted under 35 U.S.C. 154(b) by 577 days.

(21) Appl. No.: 17/801,438

(22) PCT Filed: May 6, 2021

(86) PCT No.: PCT/US2021/031028
§ 371 (c)(1),
(2) Date: Aug. 22, 2022

(87) PCT Pub. No.: WO2021/226308
PCT Pub. Date: Nov. 11, 2021

(65) Prior Publication Data
US 2023/0109168 A1     Apr. 6, 2023

Related U.S. Application Data

(60) Provisional application No. 63/020,810, filed on May 6, 2020.

(51) Int. Cl.
| | |
|---|---|
| C09D 133/08 | (2006.01) |
| C08K 9/10 | (2006.01) |
| C09D 7/40 | (2018.01) |
| C09D 7/43 | (2018.01) |

(52) U.S. Cl.
CPC .......... *C09D 133/08* (2013.01); *C08K 9/10* (2013.01); *C09D 7/43* (2018.01); *C09D 7/70* (2018.01)

(58) Field of Classification Search
CPC .... C09D 133/00–16; C09D 139/00–08; C09D 7/43; C08K 9/10
See application file for complete search history.

(56) References Cited

U.S. PATENT DOCUMENTS

| | | | |
|---|---|---|---|
| 6,207,738 B1 | 3/2001 | Zuckerman et al. | |
| 9,365,745 B2 | 6/2016 | Gerst et al. | |
| 9,938,365 B2 | 4/2018 | Hartmann et al. | |
| 2010/0327216 A1 | 12/2010 | Jung et al. | |
| 2015/0111984 A1* | 4/2015 | San Jose ............ | C09D 5/18 523/122 |
| 2016/0168439 A1 | 6/2016 | Ayambem | |
| 2019/0211171 A1 | 7/2019 | Aou et al. | |

FOREIGN PATENT DOCUMENTS

| | | | | |
|---|---|---|---|---|
| CN | 108129923 A | | 6/2018 | |
| CN | 110776789 A | * | 2/2020 | ............ C09D 7/63 |
| EP | 2253653 A1 | | 11/2010 | |
| EP | 2800780 B1 | | 3/2018 | |
| EP | 3470493 A1 | | 4/2019 | |
| JP | 6656046 | | 3/2020 | |
| WO | 2017117515 A1 | | 7/2017 | |
| WO | 2017210439 A1 | | 12/2017 | |

OTHER PUBLICATIONS

Partial machine translation of CN-110776789-A (Year: 2022).*
PCT/US2021/031028 International Search Report and Written Opinion with a mailing date of Jul. 30, 2021.

* cited by examiner

*Primary Examiner* — Kregg T Brooks

(57) ABSTRACT

The present invention provides cooling, substantially formaldehyde and alkylphenylethoxylate (APEO) free aqueous coating compositions of a soft acrylic or vinyl copolymer binder comprising from 1.8 to 5 wt. %, based on the total weight of monomers used to make the copolymer, of an ethylenically unsaturated acid functional group containing monomer, in copolymerized form, and, in copolymerized form, an adhesion promoting ethylenically unsaturated monomer; an aqueous encapsulated PCM (phase change material) having a crosslinked acrylic shell; a nonionic associative thickener, such as a polyurethane associative thickener; and a softener. The aqueous coating compositions have a pH ranging from 7 to 8 and a solids content as high as 70 wt. % and provide soft coatings for viscoelastic polyurethane foams.

11 Claims, No Drawings

STORAGE STABLE PCM CONTAINING AQUEOUS COOL COATINGS FOR FLEXIBLE FOAMS

The present invention relates to temperature regulating aqueous acrylic or vinyl coating compositions and coatings. More particularly, it relates to aqueous acrylic or vinyl coating compositions comprising a soft copolymer binder and a PCM (phase change material) encapsulated in an acrylic shell, to coatings made therefrom, and to coated viscoelastic foams having the coatings thereon.

BACKGROUND OF THE INVENTION

Encapsulated phase change materials (PCM) enable temperature regulation and a cool surface to the touch in personal articles, such as viscoelastic or memory foam pillows and mattresses, treated with compositions containing them. However, in viscoelastic polyurethane foam applications, for example, several application and performance challenges remain before PCMs can effectively be used. PCM material solutions currently known suffer from a shelf life stability of less than 3 months; they cannot be used without premixing or remixing, and, even then, their use often results in an observable and unreversible separation, agglomeration or crystallization of the dispersed individual particles or other solids. Further, many solutions need premixing just prior to application. Still further, PCM containing materials desirably should comply with existing ecolabels, such as ECO Passport Oekotex 100 by OEKO-TEX™ (International Association for Research and Testing in the Field of Textile and Leather Ecology, Zurich, SW). For example, LGA Tested ecolabel standards in Class II applications, for direct contact to skin, for example, bedding, furniture, textiles, etc., require formaldehyde free materials, and a maximum of 45 ppm of alkyl phenyl ethoxylates (APEO) in the formulated system and minimal other volatile organic compounds (VOCs) in the form of total VOC (TVOC) (Landesgewerbeanstalt Bayern, TUV Rheinland, Cologne, DE). In addition, the need remains for higher cooling efficiency of the PCM containing materials as well as improved haptics.

Recently, WIPO publication WO2017210439A1 to Dow Global Technologies, Inc. and Kaoru Aou et al., has disclosed a viscoelastic foam PCM containing formulation made from an in-process coated foam which may contain formaldehyde. Further, the publication fails to provide evidence that the coated foam provides cooling efficiency to the coated foam in use.

The present inventors have endeavored to provide a shelf stable coating for making a coated viscoelastic foam a well as the coated viscoelastic foam itself that provides cooling efficiency to the user of articles made from the coated viscoelastic foam.

SUMMARY OF THE INVENTION

In accordance with the present invention, aqueous acrylic or vinyl coating compositions may comprise: a soft acrylic or vinyl copolymer binder having a calculated glass transition temperature of from −75° C. to −25° C. and comprising from 1.8 to 5 wt. %, based on the total weight of monomers used to make the copolymer, of an ethylenically unsaturated acid functional group containing monomer in copolymerized form, from 0.5 to 4 wt. %, based on the total weight of monomers used to make the copolymer, of an adhesion promoting ethylenically unsaturated monomer in copolymerized form; an aqueous encapsulated PCM (phase change material), for example, of an organic wax, having a crosslinked acrylic shell, such as a copolymer comprising, in copolymerized form, one or more diethylenically unsaturated monomer, for example, a glycol or diol di(meth) acrylate; and from 0.05 to 1.4 wt. %, based on the total weight of the aqueous coating composition, of a nonionic associative thickener, such as a polyurethane associative thickener, or, preferably, a hydrophobically modified ethoxylated urethane (HEUR), wherein the aqueous coating composition has a solids content of from 25 wt. % to 70 wt. %, or, for example, from 30 to 65 wt. %, and has a pH ranging from 7 to 8 or, preferably, from 7.2 to 7.75. Further, the aqueous coating compositions may comprise from 3 to 15 wt. %, based on the total weight of the aqueous coating composition, of a softener, such as a polyalkylene glycol having a molecular weight of from 200 to 1000. Still further, the aqueous coating compositions may be substantially formaldehyde free, for example, by containing no added formaldehyde or formaldehyde containing materials. Yet still further, the aqueous coating compositions may contain a level of alkylphenylethoxylate (APEO) of less than 50 ppm, or, preferably, may have no added APEO containing materials.

In another aspect in accordance with the present invention, coated viscoelastic foams, such as viscoelastic polyurethane foams, may comprise the viscoelastic foam coated with aqueous acrylic or vinyl coating compositions comprising a soft acrylic or vinyl copolymer binder having a calculated glass transition temperature of from −75° C. to −25° C. and comprising 1.8 to 5 wt. %, based on the total weight of monomers used to make the copolymer, of an ethylenically unsaturated acid functional group containing monomer in copolymerized form, from 0.5 to 4 wt. %, based on the total weight of monomers used to make the copolymer, of an adhesion promoting ethylenically unsaturated monomer in copolymerized form; an aqueous encapsulated PCM (Phase change material), for example, of an organic wax, having a crosslinked acrylic shell, such as a copolymer comprising, in copolymerized form, one or more diethylenically unsaturated monomer, for example, a glycol or diol di(meth)acrylate; and from 0.05 to 1.4 wt. %, based on the total weight of the aqueous coating composition, of a nonionic associative thickener, wherein the aqueous coating has a pH ranging from 7 to 8, or from 7.2 to 7.75. Further, the aqueous coating may comprise from 3 to 15 wt. %, based on the total weight of the aqueous coating composition, of a softener, such as a polyalkylene glycol having a molecular weight of from 200 to 1000. Still further, the aqueous coating may be substantially formaldehyde free, for example, by containing no added formaldehyde or formaldehyde containing materials. Yet still further, the aqueous coating may contain a level of alkylphenylethoxylates (APEO) of less than 50 ppm, or, preferably, may have no added APEO containing materials.

DETAILED DESCRIPTION OF THE INVENTION

In accordance with the present invention, aqueous coating compositions containing encapsulated phase change materials (encapsulated PCMs) that enable a PCM loading of above 50 wt. %, based on total solids, and that exhibits a shelf life of 6 months or more without creaming or sedimentation taking place. The aqueous coating compositions may have a neutral pH. Further, all materials in the aqueous coating compositions of the present invention, are compatible with one another, and there is no need for pre-mixing prior to use. In addition, the present invention provides methods for making the aqueous coating compositions using conventional mixing equipment which exclude dissolvers or other high shear mixing equipment that can damage encapsulated PCM particles.

The aqueous coating compositions in accordance with the present invention may substantially formaldehyde and APEO free and may, for example, contain no added formaldehyde or formaldehyde containing materials. Further, the aqueous coating compositions may contain a level of alkylphenylethoxylates (APEO), or its derivatives containing APEO groups, of less than 50 ppm, such as, preferably, having no added APEO containing materials.

In accordance with the present invention, the aqueous coating compositions may comprise a soft acrylic or vinyl copolymer binder having a calculated glass transition temperature of from −75° C. to −25° C. or, preferably, from −50° C. to −25° C., and comprising 1.8 wt. % or more, for example, up to 5 wt. %, or, preferably, from 2 to 4 wt. %, based on the total weight of monomers used to make the copolymer, of an ethylenically unsaturated acid functional group containing monomer in copolymerized form, from 0.5 to 4 wt. %, or from 0.8 to 2.5 wt. %, based on the total weight of monomers used to make the copolymer, of an adhesion promoting ethylenically unsaturated monomer in copolymerized form. The soft copolymer binder gives coatings a soft and smooth haptic or feel to the touch and allows flexing of the substrate without cracking.

The aqueous coating compositions in accordance with the present invention may have a pH of from 7 to 8, or, for example, from 7.2 to 7.75, and may comprise a solids content of from 25 to 70 wt. % or, for example, from 30 to 65 wt. %. The solids in the aqueous coating compositions may include the soft acrylic or vinyl copolymer binder, the aqueous encapsulated PCM, the nonionic associative thickener, and any softeners, colorants or fillers. Solids in the aqueous coating compositions exclude water and coalescents.

Preferably, to enhance the shelf stability, enable an overall higher cooling efficiency and enhanced haptic or fell of the aqueous coating compositions in accordance with the present invention, the compositions may comprise a mixture of two or more aqueous encapsulated PCMs (aqueous encapsulated PCM mixture) wherein at least 10 wt. % or, at least 15 wt. %, as solids, of the mixture is in the form of a cake, such as a dewatered cake, or a mixture of aqueous encapsulated PCMs each having a different melting point ranging from 25 to 38° C., wherein each different melting point differs at least 1° C. from the other or, preferably, a mixture of a first aqueous encapsulated having a melting point of from 25 to 38° C. with a second aqueous encapsulated PCM having a melting point of from 25 to 38° C. which is at least 2° C. higher or lower than the melting point of the first aqueous encapsulated PCM.

The aqueous coating compositions in accordance with the present invention may include from 20 to 50 wt. % or, preferably, from 25 to 45 wt. % of the soft acrylic or vinyl copolymer binder, one or more aqueous encapsulated PCM in an amount ranging from 25 to 70 wt. % or, preferably, from 30 to 70 wt. %, or, preferably, from 40 to 70 wt. %.

The aqueous coating compositions in accordance with the present invention may include one or more softener in the amount ranging from 3 to 20 wt. %, or, for example, from 4 to 13 wt. %, and a nonionic associative thickener, such as a HEUR thickener, in the amount from 0.05 to 1.4 wt. %, or, preferably, from 0.1 to 0.7 wt. %, or, preferably, from 0.2 to 0.6 wt. %.

All ranges recited are inclusive and combinable. For example, a disclosed proportion of comprising 1.8 wt. % or more, for example, up to 5 wt. %, or from 2 to 4 wt. %, based on the total weight of monomers used to make the copolymer, of an ethylenically unsaturated acid functional group containing monomer in copolymerized form, would include proportions of from 1.8 to 5 wt. %, or of from 1.8 to 2 wt. %, or of from 1.8 to 4 wt. %, or of from 2 to 4 wt. %, or of from 2 to 5 wt. %, or of from 4 to 5 wt. %.

Unless otherwise indicated, all temperature and pressure units are room temperature and standard pressure and all humidity conditions are, a relative humidity of 35%.

Unless otherwise indicated, any term containing parentheses refers, alternatively, to the whole term as if parentheses were present and the term without them, and combinations of each alternative. Thus, as used herein the term, "(meth)acrylate" and like terms is intended to include acrylates, methacrylates and their mixtures.

As used herein, the term "ASTM" refers to publications of ASTM International, Conshohocken, Pa.

As used herein, unless otherwise indicated, the term "calculated Tg" or "calculated glass transition temperature" refers to the Tg of a polymer calculated by using the Fox equation (T. G. Fox, *Bull. Am. Physics Soc.*, Volume 1, Issue No. 3, page 123 (1956). For reference and use in calculating a Tg, a comprehensive compilation of available data describing glass transition temperatures of homopolymers from suitable monomers can be found in *Polymer Handbook*, Vol. 1, editors Brandrup, J.; Immergut, E. H.; Grulke, E. A., 1999, pages VI/193-277.

As used herein, the term "ISO" refers to the publications of the International Organization for Standardization, Geneva, CH.

As used herein, unless otherwise indicated, the term "melting point" refers to the temperature at which a phase change material visibly goes and from amorphous or solid state to a liquid or fluid state, or the temperature provided by the manufacturer.

As used herein, the term "(meth)acrylate" means acrylate, methacrylate, and mixtures thereof and the term "(meth)acrylic" used herein means acrylic, methacrylic, and mixtures thereof.

As used herein, the term "polymer" refers, in the alternative, to a polymer made from one or more different monomer, such as a copolymer, a terpolymer, a tetrapolymer, a pentapolymer etc., and may be any of a random, block, graft, sequential or gradient polymer.

As used herein, the term "hard vinyl monomer" means any monomer which would if polymerized to yield a homopolymer having a weight average molecular weight of 50,000 or greater form such a homopolymer with a glass transition temperature of 10° C. or more, or, preferably, 25° C. or more. Examples include (meth)acrylonitrile, methyl methacrylate, ethyl methacrylate, isopropyl methacrylate, and styrene.

As used herein, the term "soft monomer" refers to ethyl acrylate or any $C_4$ to $C_{24}$ alkyl (meth)acrylate monomer which would if polymerized to yield a homopolymer having a weight average molecular weight of 50,000 or greater form such a homopolymer with a glass transition temperature of −25° C. or less. Examples include almost any $C_4$ to $C_{24}$ alkyl(meth)acrylate except t-butyl acrylate, n-hexadecyl acrylate and neopentyl acrylate, isobornyl acrylate, butyl methacrylate, and isobutyl methacrylate. For reference, a comprehensive compilation of available data describing glass transition temperatures of homopolymers can be found in Polymer Handbook, Vol. 1, editors Brandrup, J.; Immergut, E. H.; Grulke, E. A., 1999, pages VI/193-277.

As used herein, the term "total emulsion copolymer solids" or "polymer solids" refers to the copolymerized monomers, chain transfer agents, and surfactants in a given emulsion copolymer composition.

As used herein, the term "based on the total weight of monomers used to make the copolymer," refers to the total of monomers as solids and excludes chain transfer agents.

As used herein, the term "total solids" refers to everything in a given composition other than water and volatile solvents which flash off or volatilize at below 40° C. and atmospheric pressure.

As used herein, the term "substantially formaldehyde free" refers to a composition containing less than 50 ppm of free formaldehyde, or, preferably, no added formaldehyde or formaldehyde containing materials like phenol formaldehyde or melamine formaldehyde resins or aminoplast resins.

As used herein, unless otherwise indicated, the term "median particle size" means the mathematical median particle size in a given sample of material particles as determined by light scattering (LS) using a BI-90 particle size analyzer (Brookhaven Instruments Corp. Holtsville, N.Y.) or as reported by a given manufacturer.

As used herein, the term "weight average molecular weight" or "MW" refers to the weight average molecular weight as measured by aqueous gel permeation chromatography (GPC) of a copolymer that is hydrolyzed in KOH against a polyacrylic acid (PAA) standard.

As used herein, the phrase "wt. %" stands for weight percent.

The aqueous coating compositions in accordance with the present invention comprise a soft acrylic or vinyl copolymer binder, such as an elastomeric emulsion copolymer. Such emulsion copolymers comprise the emulsion copolymerization product of one or more soft vinyl or acrylic monomer, such as butyl acrylate, ethylhexyl acrylate or lauryl methacrylate, with from 0.5 to 4 wt. %, or, for example, from 0.8 to 2.5 wt. %, based on the total weight of monomers used to make the copolymer, of at least one ethylenically unsaturated acid functional group containing monomers. Suitable ethylenically unsaturated acid functional group containing monomers may include addition polymerizable carboxylic acid monomers, for example, methacrylic acid, and, as needed, harder vinyl or acrylic monomers such as methyl methacrylate, styrene, and (meth) acrylonitrile. As is known in the art, the monomer mixture is selected to give a desired calculated Tg of from −75 to −25° C. or, for example, from −50° C. to −25° C.

The soft acrylic or vinyl copolymer binder may comprise the copolymerization product of a monomer mixture that contains no more than 20 wt. % of a vinyl aromatic monomer, such as styrene, or, preferably, 15 wt. % or less, or, more preferably, 10 wt. % or less, or, even more preferably, 5 wt. %, or no styrene or vinyl aromatic monomer.

Suitable vinyl or acrylic monomers for use as the one or more soft monomers may include, for example, ethyl acrylate, methyl acrylate, n-butyl acrylate (BA), iso-butyl acrylate, ethylhexyl acrylate (EHA), octyl methacrylate, isooctyl methacrylate, decyl methacrylate (n-DMA), isodecyl methacrylate (IDMA), lauryl methacrylate (LMA), pentadecyl methacrylate, stearyl methacrylate (SMA), octyl acrylate, isooctyl acrylate, decyl acrylate, isodecyl acrylate, lauryl acrylate (LA), the ($C_{12}$ to $C_{18}$) alkyl methacrylates, and cyclohexylacrylate. Preferably, soft monomers may include BA, EHA, or, if copolymerized in the presence of a molecular cage, like cyclodextrins, fatty or $C_{12}$ to $C_{18}$ alkyl(meth)acrylates, such as LMA, SMA, n-DMA, and IDMA.

Suitable hard acrylic or vinyl comonomers suitable for providing a desired calculated Tg may include, for example, (meth)acrylic ester monomers including $C_1$ to $C_3$ alkyl (meth)acrylates, such as methyl methacrylate (MMA), ethyl (meth)acrylate; $C_5$ to $C_{20}$ cycloaliphatic methacrylates, such as isobornyl methacrylate and cyclohexyl methacrylate; vinyl aromatics, such as styrene, alkylstyrenes (methyl and ethyl), like alpha methyl styrene; (meth)acrylonitrile or alkyl (meth)acrylonitrile; (meth)acrylamide or substituted (meth)acrylamides.

Preferably, to avoid water sensitivity in the soft acrylic or vinyl copolymer binder composition made therefrom, the amount of (meth)acrylamide or substituted (meth)acrylamides used, based on the total weight of monomers used to make the copolymer, ranges up to 2.5 wt. %, or, preferably, up to 1.25 wt. %, based on the total solids in the monomer mixture.

To improve stability in aqueous systems, the soft acrylic or vinyl copolymer binders in accordance with the present invention include acid functionality or other functionality providing hydrogen bonding or steric stabilization, such as amide functionality. Suitable ethylenically unsaturated acid functional group containing monomers are included in the feed of the soft monomer composition and may include addition polymerizable carboxylic acids, salts thereof, anhydrides thereof, and phosphorous containing or sulfur containing acid functional monomers. Examples of suitable acid monomers may include, for example, maleic acid or anhydride, phosphoalkyl (meth)acrylate, (meth)acrylamidopropane sulfonate and, preferably, methacrylic acid (MAA), acrylic acid (AA) and itaconic acid.

Examples of suitable sulfur acid monomers may include, for example, sodium styrene sulfonate (SSS), and (meth)acrylamidopropane sulfonate. Examples of suitable phosphorus acid monomers may include, for example, phosphoalkyl (meth)acrylates such as phosphoethyl methacrylate. Examples of suitable amide functional monomers may include (meth)acrylamide.

The aqueous soft acrylic or vinyl copolymer binder of the present invention comprises the copolymerizate of one or more adhesion promoting ethylenically unsaturated monomers, preferably, an ureido functional monomer, such as an ethylene ureido functional ethyl methacrylate monomer. Other such suitable monomers include ureidoalkyl(meth)acrylates, ureidoalkyl(meth)acrylamides and other ureido group containing monomers such as, for example, those disclosed in U.S. Pat. No. 3,356,627 to Scott.

The soft acrylic or vinyl copolymer binder of the present invention can be prepared by conventional emulsion polymerization methods in the presence of a nonionic and/or anionic surfactant. Surfactants may be used, for example, in amounts ranging from 0.01 to 0.4 wt. %, based on the total weight of monomers used to make the copolymer. A suitable polymerization method may comprise, for example, including in the polymerization any of a wide variety of initiators, such as thermal (e.g. persulfates, peroxides, hydroperoxides, peroxyesters) and redox initiators (suitable combinations of substantially water-soluble oxidants and reductants, e.g. tert-butyl hydroperoxide and sodium bisulfite, with or without added transition metal catalysts such as iron, cobalt, or manganese salts), and chain transfer agents, such as, for example, alkyl mercaptans. Hydrophobic chain transfer agents, such as n-dodecyl mercaptan (n-DDM or DDM) or any $C_4$ to $C_{18}$ mercaptans, may be used when polymerizing monomers containing $C_4$ or higher alkyl and/or aryl hydrocarbon groups.

To insure a high solids content in the aqueous soft acrylic or vinyl copolymer binder compositions of the present invention, such as above 45 wt. solids, chain transfer agents should be used in amounts ranging from 0 to 0.3 wt. %, or 0.01 to 0.3 wt. %, based on the weight of total solids in the monomer mixture, including the CTA, wt. %, or, preferably, 0.2 wt. % or less, or, more preferably, 0.1 wt. %, or less. The same amount of CTA may be used to result in a soft acrylic or vinyl copolymer binder having a relatively large particle size of from 200 to 500 nm and improve adhesion to a substrate.

Other suitable emulsion polymerization techniques known in the art for making emulsion copolymers from soft monomers include, for example, those disclosed in U.S. Pat. No. 5,521,266. Especially in the case of a (meth)acrylate having an alkyl group of from 8 to 24 carbon atoms, the monomer can be complexed with a macromolecular cage having a hydrophobic cavity. The molecular cage can be mixed with the monomers to form a complexed mixture and charging the complexed mixture, along with any other monomers to a reaction vessel. Alternatively, the macromolecular cage may be added to the reaction vessel before, during or after the monomer mixture has been charged. Suitable macromolecular organic compounds having a hydrophobic cavity may include, for example, cyclodextrin and cyclodextrin derivatives; cyclic oligosaccharides having a hydrophobic cavity such as cycloinulohexose, cycloinuloheptose, and cycloinuloctose; calyxarenes; and cavitants. The ratio of hydrophobic monomer solids to the solids of the macromolecular cage having a hydrophobic cavity may range from 1:5 to 5000:1, or, for example, 1:1 to 1000:1. In one example of a suitable emulsion polymerization method, a monomer mixture may be subject to gradual addition emulsion polymerization with cyclodextrin.

Another suitable emulsion polymerization method comprises shot polymerization with up to 0.2 wt. % of surfactant and up to 0.3 wt. % of chain transfer agent, based on the total solids in the monomer mixture including monomers and chain transfer agents.

Suitable soft acrylic or vinyl copolymer binders may include, for example, LIPACRYL MB-3640 polymers or RHOPLEX 1791 polymers (The Dow Chemical Co., Midland, MI) modified so that they have the pH of the aqueous coating compositions of the present invention. Such polymers tend to have a slightly higher than desired pH; use of added ethylenically unsaturated acid functional group containing monomers in making such polymers may render them suitable for use in accordance with the present invention.

In accordance with the present invention, the aqueous coating compositions comprise an aqueous encapsulated PCM (Phase change material) having a crosslinked acrylic shell, such as a copolymer comprising, in copolymerized form, one or more diethylenically unsaturated monomer, for example, a glycol or diol di(meth)acrylate. The PCM may be a material having a desirable melting point, such as a melting point at or above room temperature and as high as physiological temperature. Suitable PCM materials may be, preferably, an organic wax and may comprise a hydrocarbon wax, for example, a $C_{16}$-$C_{20}$ group containing hydrocarbon. Suitable preferred organic wax compounds may be, for example, a $C_{16}$-$C_{20}$ paraffin, such as a primary paraffin ($C_nH_{2n+2}$), a branched $C_{16}$ or $C_{18}$ alkane, such as a branched octadecane, a $C_{16}$-$C_{20}$ fatty acid, ester or alcohol, such as methyl palmitate, a lipid, a sugar alcohol, or a polyethylene glycol (PEG). A wide spectrum of PCMs are available with different heat storage capacity and phase-change temperatures. Other suitable PCMs aside from an organic wax may include, for example, inorganic compounds, e.g. salt hydrates ($M_xN_yH_2O$, where M is a metal and N is an acid conjugate, and x and y are selected so that the valence of the metal and of the acid conjugate are equal), salts, metals and their alloys, and eutectic compounds of inorganic-inorganic, organic-organic or inorganic-organic mixtures.

The PCM in the encapsulated PCM can have a melting point of from room temperature or 25° C. to body or physiological temperature (38° C.).

Preferably, in accordance with the aqueous coating composition of the present invention, the aqueous encapsulated PCM comprises an aqueous encapsulated PCM mixture of two encapsulated PCM materials having different melting points of between 25 to 38° C. at least 1° C. apart from one another.

Preferably, to increase coatings solids and improve cooling performance, at least a portion, such as at least 10, or at least 15 wt. % as solids, of the aqueous encapsulated PCM may have a solids content of 70 wt. % or higher. Suitable high solids aqueous encapsulated PCMs may include a dewatered cake of the aqueous encapsulated PCM in a PCM mixture with an aqueous emulsion of an encapsulated PCM for ease of mixing.

The aqueous coating compositions in accordance with the present invention may comprise a nonionic associative thickener which has alternating hydrophilic and hydrophobic polymer segments or domains, such as a polyurethane associative thickener; and this may improve the shelf stability of the compositions. The amount of the nonionic associative thickener may range from 0.05 to 1.4 wt. %, or, preferably, from 0.1 to 0.7 wt. %, based on the total weight of the aqueous coating composition.

Suitable polyurethane or nonionic associative thickeners may comprise hydrophobically modified ethoxylated urethanes (HEUR). Preferably, the HEUR thickeners have both pendant and end terminal hydrophobic groups. More preferably, the HEUR has pendant and terminal benzylamine hydrophobic groups.

Examples of suitable hydrophobically modified ethoxylated urethane (HEUR) thickeners may include any of (i) linear and branched HEURs formed by reacting a polyglycol, a hydrophobic alcohol, a diisocyanate, and a triisocyanate together in a one-pot reaction as in US 2009/0318595A1 to Steinmetz et al.; (ii) those formed by polymerizing in a solvent-free melt, in the presence of a catalyst, such as bismuth octoate, of a polyisocyanate branching agent, a water-soluble polyalkylene glycol having an Mw (GPC using peg standards) of from 2000 to 11,000 Daltons, a diisocyanate and a hydrophobic capping agent as in U.S. Pat. No. 9,150,683B2 to Bobsein et al.; (iii) those formed by contacting together under reactive conditions a diisocyanate, a water-soluble polyalkylene glycol, and a benzylamine hydrophobe compound of formula I, below, as in U.S. Pat. No. 9,156,776B2 to Rabasco et al., and/or a hydrophobe compound made by reaction of a benzyl(alkyl)amine or a dibenzyl(alkyl)amine with a glycidyl alcohol, such as glycidol, or a diol generating species chosen from an ethylene oxide, propylene oxide or butylene oxide gas in the presence of a strong base, as in U.S. Pat. No. 8,791,201B2 to Rabasco et al. The hydrophobic alcohol in Steinmetz may include, for example, alcohols having a carbon number ranging from 3 to 24, from 5 to 20, or from 10 to 25, such as octanol, dodecanol, tetradecanol, hexadecanol, cyclohexanol, phenol, cresol, octylphenol, nonyl phenol, dodecyl phenol, tristyrylphenol, ethoxylated tristyrylphenol, monomethyl ethers of ethylene glycol, monoethyl ethers of ethylene glycol, monobutyl ethers of ethylene glycol, monomethyl ethers of ethylene diethylene glycol, monoethyl ethers of diethylene glycol, monobutyl ethers of diethylene glycol; alkyl and alkaryl polyether alcohols such as straight or branched alkanol/ethylene oxide and alkyl phenol/ethylene oxide adducts, for example, the lauryl alcohol, t-octylphenol or nonylphenolethylene oxide adducts containing 1-250 ethylene oxide groups; and other alkyl, aryl and alkaryl hydroxyl compounds, or combinations thereof. The branching agent of Bobsein may include, for example, triisocyanates, such as 1,6,11-undecane triisocyanate; isocyanurates, such as isophorone diisocyanate isocyanurate; and biurets, such as tris(isocyanatohexyl) biuret; the hydrophobic capping agent of Bobsein may include, for example, at least one of n-octanol, n-nonanol, n-decanol, n-undecanol, n-dodecanol, 2-ethylhexanol, 2-butyl-1-octanol, or 3,7-dimethyl-1-octanol.

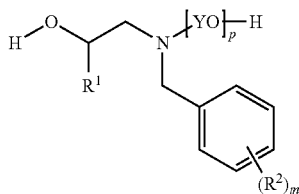

I

In the benzylamine hydrophobe compound of formula I, above, $R^1$ is $C_1$-$C_{16}$-alkyl, phenyl, naphthyl, $C_1$-$C_{16}$-alkylphenyl, $C_1$-$C_{16}$-alkylnaphthyl, or —$CH_2$—$OR^4$, where $R^4$ is $C_1$-$C_{12}$-alkyl, phenyl, naphthyl, $C_1$-$C_{12}$-alkylphenyl, or $C_1$-$C_{12}$-alkylnaphthyl; each $R_2$ is independently $C_1$-$C_6$-alkyl; each Y is independently $C_3$-$C_8$-alkylene or $CH_2CHR^3$, where each $R^3$ is independently H, $C_1$-$C_{12}$-alkyl, phenyl, naphthyl, $C_1$-$C_{12}$-alkylphenyl, or $C_1$-$C_{12}$-alkylnaphthyl: m is 0, 1 or 2; and p is from 1 to 50.

Further, in accordance with the present invention, the aqueous coating compositions may comprise a softener, such as a polyalkylene glycol having a formula molecular weight of from 200 to 1000, for example, a polyethylene glycol or a polypropylene glycol. One suitable polyethylene glycol or a polypropylene glycol has a formula molecular weight of from 350 to 450.

In accordance with the present invention, suitable amounts of the softener may range from 3 to 15 wt. %, or, for example, from 4 to 12 wt. %.

The aqueous coating compositions of the present invention can further comprise auxiliary ingredients, such as one or more antioxidants, colorants, or dyes. Suitable amounts of colorants may range from 0.01 to 0.5 wt. %, or, from 0.1 to 0.4 wt. %, based on the total weight of the composition.

In another aspect in accordance with the present invention, methods of making the aqueous coating compositions may comprise mixing, in order, the aqueous soft acrylic or vinyl copolymer binder and from 15 to 30 wt. % of the nonionic associative thickener at a maximum of 200 rpm for 5 to 15 min in a first mixing stage while adding any dewatered cake of an aqueous encapsulated PCM, in a second stage, mixing in aqueous encapsulated PCM other than as a cake at a maximum of 200 rpm for 5 to 15 min, in a third stage, mixing in any softener and, if used, colorant at a maximum of 200 rpm for 5 to 15 min, in a fourth stage, mixing in the remaining nonionic associative thickener and mixing at a maximum of 500 rpm for 10 to 15 min.

The aqueous coating compositions can be coated onto the foam substrate in any conventional manner, including by roller, curtain blade, spray gun or brush. The viscosity of the coating compositions may be optimized by varying the amount of the nonionic associative thickener so that they provide a smooth high quality cool coating on the surface of the foam.

In accordance with the present invention, coated viscoelastic polyurethane foam substrates bear a coating of the aqueous coating composition. Suitable foam substrates may include, for example, viscoelastic, slow recovery or memory foams, such as polyurethane foams having a resiliency of less than or equal to 20% as measured according to ASTM D3574-17 (2017). Other suitable coated substrates may include, for example, high resiliency polyurethane foams, other slabstock polyurethane foams, and rigid polyurethane foams. Suitable foam substrates may formed as free-rise foams or molded foams.

Suitable foam substrates may be close cell foams or open cell foams. Close celled foams may comprise viscoelastic foams comprising a skin from molding; open cell foam may comprise cut outs taken from slabs or molded foams wherein the surface other than the skin is an open cell foam. A viscoelastic (VE) foam substrate made in accordance with the present invention may be made from a reaction mixture of at least one polyisocyanate, a polyol composition and at least one blowing agent. The reaction mixture may contain other reactants.

For making viscoelastic polyurethane foams, suitable polyol compositions may comprise polyols having an equivalent weight per isocyanate-reactive group of greater than 400 may include polyether polyols, polyester polyols, amine-terminated polyethers and the like. The equivalent weight may be, for example, at least 500, at least 750, at least 1000, at least 1200 or at least 1500 and may be, for example, up to 4000, up to 3000, up to 2500 or up to 2000. Polyols having an equivalent weight of greater than 400 may constitute, for example, up to 50 wt. %, up to 40 wt. %, up to 30 wt. %, up to 25 wt. %, up to 20 wt. %, up to 15 wt. %, up to 10 wt. % or up to 5 wt. % of all isocyanate-reactive materials in the reaction mixture. Such polyols may have 2 to 8, 2 to 4, or 3 to 4 isocyanate-reactive groups per molecule. An example of a suitable, polyether polyol may include, for example, homopolymers of propylene oxide and random polymers of at least 70 wt. % propylene oxide and up to 30 wt. % ethylene oxide.

Suitable polyether polyols useful as polyol compositions in making viscoelastic polyurethane foams may be formed from co-initiated diol and/or triol starters or reactants. Suitable diol starters have exactly two hydroxyl groups and a molecular weight of up to 150. The molecular weight of the diol starter may be, for example, 62 to 150, 62 to 125, 62 to 100 or 62 to 90. Examples of diol starters include ethylene glycol, 1,2-propylene glycol, 1,3-propylene glycol, 1,4-butane diol, diethylene glycol, thiodiethanol, N-methyldiethanolamine and dipropylene glycol. Suitable triol starters have exactly three hydroxyl groups and a molecular weight of up to 150. The molecular weight of the triol starter may be, for example 90 to 150. Examples of triol starters include glycerin, trimethylolpropane and triethanolamine. Difunctional polyether polyols may be formed from solely diol starters; and, if triol starters are used, then trifunctional polyether polyols result. To form trifunctional polyether polyols, diol and triol starters are provided in relative amounts sufficient to provide the polyether composition with an average nominal functionality of from 2.05 to 2.95, as disclosed below.

Preferably, a viscoelastic polyurethane foam that is easily processed into a good quality foam via a free-rise process at isocyanate indices of at least 90 or at least 95 may comprise the cured polyurethane foam formed from a co-initiated polyol composition comprising at least one difunctional polyether A) having a hydroxyl equivalent weight of 200 to 400 and at least one trifunctional polyether B) having a hydroxyl equivalent weight of 200 to 400, the at least one difunctional polyether and at least one trifunctional polyether each including a) the residue, after removal of hydroxyl hydrogen atoms, of a diol and/or a triol starter, b) oxypropylene units and c) oxyethylene units, wherein polyether reactants A) and B) together have an average nominal functionality of 2.05 to 2.95, the combined weight of the oxyethylene units of polyether reactants A) and B) constitutes 40 to 63 wt. % of the combined weight of difunctional polyether A) and trifunctional polyether B), the combined weight of the residues of the starters, oxypropylene units and oxyethylene units of reactants A) and B) constitute at least 90 wt. % of the combined weight of difunctional polyether A) and trifunctional polyether B), and from 5 to 30 percent of the total number of hydroxyl groups in the polyether reactants A) and B) are primary hydroxyl groups. Polyether reactants A) and B) of the polyol composition together may constitute, for example at least 20 wt. %, at least 33 wt. %, at least 40 wt. %, at least 50 wt. %, at least 60 wt. %, at least 65 wt. %, at least 75 wt. % or at least 85 wt. % of all isocyanate-reactive compounds (including any water, when present) in the reaction mixture. Polyether reactants A) and B) together may constitute up to 99.5 wt. %, up to 99 wt. %, up to 95 wt. % or up to 90 wt. % of the isocyanate-reactive compounds. The at least one difunctional polyether A) and the at least one trifunctional polyether B) each may have a hydroxyl equivalent weight of at least 205, at least 215 or at least 220, up to 350, up to 300, up to 275 or up to 250. Likewise, the hydroxyl equivalent weight of the polyol composition may be at least 200, at least 215, at least 220, and up to 400, up to 300, up to 275 or up to 250.

The average nominal functionality (number of hydroxyl groups per molecule) of the at least one difunctional polyether and the at least one trifunctional polyether (reactants A) and B)) may be at least 2.2, at least 2.3 or at least 2.4 and may be up to 2.8, up to 2.7 or up to 2.6. The average functionality of polyether reactants A) and B) of the polyol composition is calculated from the functionalities of the diol and triol starters used to prepare polyether reactants A) and B), respectively, as follows:

Average nominal functionality =

$$\frac{(2 \times \text{moles diol starters}) + (3 \times \text{moles triol starters})}{(\text{moles diol starters} + \text{moles triol starters})}$$

In accordance with the preferred viscoelastic polyurethane foam, methods for making a co-initiated polyether polyol composition, comprise polymerizing a mixture of 50 to 80 wt. % ethylene oxide and 20 to 50 wt. % of propylene oxide onto a mixture of at least one diol starter having a molecular weight of at most 150 and at least one triol starter having molecular weight of at most 150 to form an intermediate polyether mixture that includes at least one difunctional, random copolyether of ethylene oxide and propylene oxide and at least one trifunctional, random copolyether of ethylene oxide and propylene oxide, and then polymerizing 100 wt. % propylene oxide or a mixture of at least 90 wt. % propylene oxide and at most 10 wt. % ethylene oxide onto the intermediate polyether mixture to produce the co-initiated polyether polyol composition. The co-initiated polyether polyol composition may have a hydroxyl equivalent weight of 200 to 400 and an average nominal functionality of 2.05 to 2.95 hydroxyl groups/molecule, wherein 5 to 30 percent of the hydroxyl groups of the co-initiated polyether polyol are primary hydroxyl groups and polymerized ethylene oxide constitutes 40 to 63 wt. % of the co-initiated polyether polyol.

Aside from the polyol composition, other suitable isocyanate-reactive compounds in the viscoelastic polyurethane foam forming reaction mixture may include water, one or more chain extenders, or one or more crosslinkers having an equivalent weight per isocyanate-reactive group of greater than 400.

In the reaction mixture, water may be present in the amount of up to 3.5 wt. %, or 0.5 wt. % to 3.5 wt. %, or 1 wt. % to 2 wt. % of the isocyanate-reactive materials in the reaction mixture. Water functions as both a blowing agent and, when added to isocyanate prior to mixing with a polyol composition, a chain extender. Chain extenders (other than water) are compounds that react difunctionally with isocyanate groups and have equivalent weights per isocyanate-reactive group of less than 200, preferably 30 to 125. Examples of other chain extenders include ethylene glycol, diethylene glycol, triethylene glycol, propylene oxide, dipropylene glycol, tripropylene glycol, 1,4-butanediol, 1,6-hexanediol, ethylene diamine, propylene diamine, and the like. Chain extenders may constitute no more than 5 wt. %, no more than 2.5 wt. %, no more than 1 wt. % or no more than 0.5 wt. % of all isocyanate-reactive materials in the reaction mixture. Suitable crosslinkers have three or more isocyanate-reactive groups and may have equivalent weights per isocyanate-reactive group of less than 200, such as from 30 to 125. Examples of suitable crosslinkers include glycerin, trimethylolpropane, triethylolpropane, pentaerythritol, erythritol, triethanolamine, diethanolamine, mannitol, sucrose, urea, sorbitol and the like. If used, crosslinkers may constitute at least 0.25 wt. %, or no more than 5 wt. %, no more than 2.5 wt. %, no more than 1 wt. % or no more than 0.5 wt. % of all isocyanate-reactive materials in the reaction mixture.

Suitable polyisocyanate compounds in the reaction mixture for making viscoelastic polyurethane foams may have an isocyanate equivalent weight of up to 300, for example. The isocyanate equivalent weight may be up to 250, up to 175, or from 50 to 175. If a mixture of polyisocyanate compounds is used, these equivalent weights apply with respect to the mixture; individual polyisocyanate compounds in such a mixture may have isocyanate equivalent weights above, within or below those ranges.

Examples of useful polyisocyanates may include m-phenylene diisocyanate, toluene-2,4-diisocyanate, toluene-2,6-diisocyanate, hexamethylene-1,6-diisocyanate, tetramethylene-1,4-diisocyanate, cyclohexane-1,4-diisocyanate, hexahydrotoluene diisocyanate, naphthylene-1,5-diisocyanate, 1,3- and/or 1,4-bis(isocyanatomethyl)cyclohexane (including cis- and/or trans isomers), methoxyphenyl-2,4-diisocyanate, diphenylmethane-4,4'-diisocyanate, diphenylmethane-2,4'-diisocyanate, hydrogenated diphenylmethane-4,4'-diisocyanate, hydrogenated diphenylmethane-2,4'-diisocyanate, 4,4'-biphenylene diisocyanate, 3,3'-dimethoxy-4,4'-biphenyl diisocyanate, 3,3'-dimethyl-4-4'-biphenyl diisocyanate, 3,3'-dimethyldiphenyl methane-4,4'- diisocyanate, 4,4',4"-triphenyl methane triisocyanate, polymethylene polyphenylisocyanate (PMDI), toluene-2,4, 6-triisocyanate and 4,4'-dimethyldiphenylmethane-2,2',5,5'-tetraisocyanate. Diphenylmethane-4,4'-diisocyanate, diphenylmethane-2,4'-diisocyanate and mixtures thereof are herein referred to as "MDI". As used herein, "Polymeric MDI" is a mixture of PMDI and MDI. Toluene-2,4-diisocyanate, toluene-2,6-diisocyanate and mixtures thereof are generically referred to as TDI. Specific useful polyisocyanates may include MDI, TDI, PMDI, diphenylmethane-4,4'-diisocyanate, diphenylmethane-2,4'-diisocyanate, PMDI, toluene-2,4-diisocyanate, toluene-2,6-diisocyanate or mixtures thereof.

In the reaction mixture for making viscoelastic polyurethane foams, the isocyanate index may be, for example, 60 to 150, such as at least 70, at least 80, at least 90 or at least 95, or up to 120 up to 110, up to 105 or up to 100. As used herein, the term "isocyanate index" refers to 100 times the ratio of isocyanate groups to isocyanate-reactive groups provided by the reaction mixture prior to the consumption of any of those groups in the curing reaction that forms the foam.

The reaction mixture preferably contains one or more catalysts, such as, for example, tertiary amines, cyclic amidines, tertiary phosphines, various metal chelates, acid metal salts, strong bases, various metal alcoholates and phenolates and metal salts of organic acids. The catalysts of most importance are tertiary amine catalysts, cyclic amidines, zinc catalysts and tin catalysts. Examples of tertiary amine catalysts may include trimethylamine, triethylamine, triethylenediamine or mixtures thereof. Reactive amine catalysts, such as DMEA (dimethylethanolamine) or DMAPA (dimethylaminopropyl amine), or amine-initiated polyols, acting as autocatalytic polyols, may also be used to reduce VOCs (volatile organic compounds). Examples of metal-containing catalysts are tin, bismuth, cobalt and zinc salts. Suitable tin catalysts may include stannic chloride, stannous chloride, stannous octoate, stannous oleate, dimethyltin dilaurate, dibutyltin dilaurate, tin ricinoleate and other tin compounds of the formula $SnR_n(OR)4-n$, wherein R is alkyl or aryl and n is 0 to 18. Tin carboxylates in which the carboxylate group has 6 to 18 carbon atoms may lower VOCs in the product foam. Zinc and tin catalysts, if used, may be used in conjunction with one or more tertiary amine catalysts at all. Catalysts may be used in small amounts, such as from 0.0015 to 5 wt. % of polyol(s). Zinc and tin catalysts may be used in very small amounts within this range, such as from 0.0015 to 0.25 wt. % of polyols.

Other ingredients suitable for making viscoelastic polyurethane foams may include one or more foam-stabilizing surfactants, auxiliary blowing agents, chemical (exothermic) blowing agents such as silicone surfactants like those commercially available under the trade names Tegostab™ (Th. Goldschmidt and Co.), Niax™ (GE OSi Silicones) and Dabco™ (Air Products and Chemicals). in the reaction mixture. Such auxiliary blowing agents include physical (endothermic) blowing agents such as various low-boiling chlorofluorocarbons, fluorocarbons, hydrocarbons and the like; as well as chemical (exothermic) blowing agents (other than water) that decompose or react under the conditions of the polyurethane-forming reaction. In addition, a gas such as carbon dioxide, air, nitrogen or argon may be used as an auxiliary blowing agent in a frothing process. Carbon dioxide can also be used as a liquid or as a supercritical fluid. Still further, the reaction mixture may contain cell openers or solid or liquid flame retardants, such as aluminum-containing compounds or melamine.

Viscoelastic polyurethane foams may be prepared by combining the polyol composition, water and polyisocyanate(s) and any other ingredients to form the reaction mixture, such as by using a mixhead or other apparatus that creates an intimate mixture. The ingredients of the polyol mixture all can be mixed together before they are combined with the polyisocyanate. Alternatively, they can be combined with the polyisocyanate individually (i.e., as separate streams), or can be formed into any sub-mixtures that are then combined with the polyisocyanate. Preferably, the water and polyols are combined with the polyisocyanate simultaneously or nearly simultaneously, such as within 5 seconds. The reaction mixture is then foamed and cured.

Such methods for making viscoelastic polyurethane foams may require no special processing conditions; therefore, processing conditions and equipment known in the art for making viscoelastic polyurethane foam are entirely suitable. In general, when a catalyst is present, the isocyanate compounds will react spontaneously with water and the polyols even at room temperature (22° C.). If necessary, heat can be applied to the reaction mixture to speed the curing reaction, such as by heating some or all of the ingredients prior to combining them, by applying heat to the reaction mixture, or some combination of each. Curing is continued until the reaction mixture has expanded and cured sufficiently to form a stable foam.

Curing of the reaction mixture may be performed in a closed mold such that reaction mixture is formed in the mold itself or formed outside the mold and then injected into the mold where it cures. The expansion of the reaction mixture as it cures is constrained by the internal surfaces of the mold, as are the size and geometry of the molded part. Curing may be performed in a free-rise (or slabstock) process, wherein the reaction mixture is poured into an open container such that expansion in at least one direction (usually the vertical direction) occurs against the atmosphere or a lightweight surface (such as a film) that provides negligible resistance to the expansion of the foam. The expansion in at least one direction remains essentially unconstrained except by its own weight. The free-rise process may be performed by forming the reaction mixture and dispensing it into a trough or onto a conveyor where it expands and cures. In a continuous free-rise process, the reaction mixture is continuously dispensed into a trough or other reaction zone where it rises and expands.

Suitable coated polyurethane foams may be useful in a variety of packaging applications, comfort applications, such as mattresses including mattress toppers, pillows, furniture, and seat cushions; shock absorber applications, such as bumper pads, sport and medical equipment, and helmet liner); noise and/or vibration dampening applications, such as earplugs, and automobile panels; and filtration applications, such as vacuum air filters and gutter guards for protecting rain gutters against debris such as plant leaves and melting snow.

EXAMPLES

The following examples are used to illustrate the present invention. Unless otherwise indicated, all temperatures are ambient temperatures (21-23° C.), all pressures are 1 atmosphere and relative humidity is 35%. Notwithstanding that the numerical ranges and parameters setting forth the broad scope of the invention are approximations, numerical values set forth in the specific examples are reported as precisely as possible. Any numerical value inherently contains certain errors necessarily resulting from the standard variation found in their respective testing measurements.

The materials used in the Examples, below, are set forth in Table 1, below. Aqueous coating compositions were made by mixing the ingredients listed in Table 2, below. The ingredients were blended with gradual addition of components and using a desktop mixer until readily blended and then the resulting aqueous coating compositions are allowed to sit on a shelf at room temperature and pressure for a period of 6 months. The indicated compositions were then analyzed for sedimentation stability using a backscattering device, as disclosed below. The indicated compositions were then drawn down using a roller (if containing 0.5 wt. % thickener) or sprayed (if containing 0.3 wt. % thickener) upon a viscoelastic closed cell polyurethane slabstock or molded foam (resiliency ≤20% per ASTM D3574-17 (2017)) substrate to give a coating at a loading of for 250 g/m² on the foam. In Examples 1 to 10, below, a coated cut slabstock foam (MDI viscoelastic foam (Density 50 kg/m³, hardness 1.5 kPa at 40% compression of the foam material) with airflow of 1 dm³/s (ISO 7231:84 (uncrushed foam)) was tested; in Examples 11 to 12 a coating on close celled molded foam density 45 kg/m³ (ISO845-88 (2009)) and hardness 1.5 kPa (40% compression) (ISO3386-1 (2010)) was tested.

The resulting coating layers were allowed to dry at room temperature for a minimum of 1 min and then were subject to the following tests, the results of which are presented in Tables 2, 3 and 4, below:

Blend Stability: After aging for the indicated time at 20° C. and at 40° C., the indicated coating compositions were measured weekly in accordance with ISO/TR 12097 (2013) over 8 hr with 1500 scan repetition using a Turbiscan™ LAB Stability Analyzer (Formulaction SAS, L'Union, FR). to apply NIR Scan to measure backscattering %. An acceptable BS % (Back scattering) result is more than 87%, reported as the proportion of stable particles in the emulsion, with no observed creaming or sedimentation in the coating composition.

The thermal analysis data of the indicated coating compositions, given in Table 4, below, were measured and compared to not-coated or naked cut flex slab foam for each of cut flex slab foam without skin (Examples 1 to 10), molded foam with skin (Examples 11 to 12). Cooling intensity and cooling half time was measured for each coated foam slab having a 250 gr/m² load of coating composition deposited thereon using a brush to prepare the coating. A transient plane source basic method using the Hot Disk TPS 2500S (Hot Disk AB, Goteborg, Sweden) instrument was used to measure performance versus time. A Hot Disk 4922 sensor (14 mm radius nickel double-spiral laminated in a Kapton™ poly(4,4'-oxydiphenylene-pyromellitimide) film (DuPont, Wilmington, DE)) was centered and sandwiched between two 10.24×10.24×2.56 cm (4×4×1 in) slabs of foam. If the foam had a coating, the coated side of each slab was aligned in contact with the sensor. Regularly, an uncoated foam slab was used to calibrate measurement of and to insure control of bulk foam baseline performance. A gentle compression was applied using the screw of the sample holder with a force barely sufficient to close the air gaps between the foam slab and the hot disc sensor but low enough to avoid substantial foam deformation. Each coated foam slab was tested at least 2 times in different positions on the coated surface and at least three foam slabs were tested in each example. Each foam slab was thermally equilibrated at room temperature for at least 20 min before each test. Each test consisted of applying constant heating power to each sensor sandwiched between two foam slabs over 40 s and measuring the sensor's spatial average temperature rise ($\Delta T$). The heating power level was selected to yield a $\Delta T$ of ≈20° C. in 40 s, which mimics heating of the foam by contact with the human body. For each of the tested foam slabs, 0.5, 0.75 and 1.5 W heating power was applied in each of the three tests. The raw data generated were charted as cooling intensity and cooling half time values according to Carslaw and Jaeger et al. (Section 2.9, Eqn. 8 of Carslaw, H. S, &Jaeger, J. C., *Conduction Of Heat In Solids*, Oxford: Clarendon Press, 1959, 2$^{nd}$ ed.), assuming a homogeneous infinite solid and an initial uniform temperature distribution. Assuming at a time zero a constant and uniform flux of heat is imposed from a planar sensor source inside the solid, this flux creates a temperature rise $\Delta T$ at the source given by the following formula:

$$\Delta T = \frac{P}{A\sqrt{\pi}} \cdot \frac{1}{e}\sqrt{\tau}$$

wherein, P is the total heating power in watts emitted in opposite directions from each sensor having an area A (i.e. total hear flux emitted from both sides is P/A), $\tau$ is time and e is the thermal effusivity of the solid. Thermal diffusivity was determined from the Hot Disc data ($\Delta T$ vs. $\tau$) by solving the equation for e:

$$e \cong \frac{P}{A\sqrt{\pi}} \cdot \frac{1}{\Delta T/\sqrt{\tau}}$$

Treating the variable $dT/d\sqrt{\tau}$ as a slope in the data curve, the instantaneous heat flux required to sustain a unit slope of transient surface temperature rise vs. root time was calculated to define cooling power of a give unit of surface area as $$\frac{W\sqrt{s}}{K} \cdot cm^2,$$

where P and W are equivalent. The maximum of this value was defined as cooling power or $CP_{Max}$; and, the minimum of this value was defined as cooling power or $CP_{Min}$. Cooling half-time is the time that the data curve refers to as $$\frac{1}{2}(CP_{Max} + CP_{min}).$$

The coated roam slabs were evaluated against naked foam with flat Temp-time profile and having a mean cooling intensity of 61 W·s$^{1/2}$/K·m² and an error of 0.2 W·s$^{1/2}$/K·m². Therefore, values higher than 61 W·s$^{1/2}$/K·m² correlate with perceived enhanced cooling performance. A passing score of cooling intensity correlates to acceptable cooling performance equivalent to hand touch is greater than 350 W·s$^{1/2}$/K·m² combined with a cooling half time of more than 10 s, preferably, greater than 700 W·s$^{1/2}$/K·m² combined with cooling duration more than 20 s.

Haptic: A measure of feel was determined qualitatively to touch by hand at room temperature. A rating system of 1 to 3 was assigned to the results, with 3 being better than; 2 being comparative to and 1 being not comparative to commercially available equivalent aqueous coating compositions for cool coating purposes. The comparative aqueous coating compositions were blended by hand and comprise the aqueous encapsulated PCM, and aqueous emulsion polymer of Example C1. The indicated foam slabs or molded pieces were tested in blind tests by hand. Results reported are the statistical average of 3 sets of testers in varied order over a 1 week time span.

Prolonged Freshness: A measure of feel was determined qualitatively to touch by hand at room temperature. A rating system of 1 to 3 was assigned to results, with 3 being better than; 2 being comparative to and 1 being not comparative to the same loading of an aqueous coating composition on the same foam slab. The indicated foam slabs were tested in blind tests by hand. Results reported are the statistical data of 3 sets of testers in varied order over 1 week time span.

Slab/Mold Compatibility: Tests drying rate at room temp. An acceptable result includes coating compositions that dry within 20 min and that can be adjusted via the level of the thickener to be applied on the foam either with rollers or via spray.

Production Ease: Refers to compositions that have no need of specialized application or premixing/postmixing/recirculation equipment, such as mixing heads.

Viscosity: Was tested at 20° C. using a Brookfield viscometer model RVT, equipped with a number 3 spindle at 20 RPM in accordance with ASTM D4889-15 (2015). An acceptable viscosity range lies from 1700 to 3000 mPa*s at 20° C.

Breathability: (airflow measurements, ISO 7231:84 (uncrushed)). Evaluates resistance to the passage of a constant flow of air through the indicated foam using an FX 3300 Lab Air™ IV air permeability tester (Textest Instruments, Schwerzenbach, CH). Testing was carried out under indicated conditions of either 23±2° C. and 50±5% relative humidity. The foam having a 25 cm$^2$ surface area is placed in the tester cavity with the indicated coating or control naked surface on the side exposed to low pressure and insuring that the foam is free from undue strains and that a good air seal was obtained along the edges of the foam and apparatus. Measurement of the airflow was carried out at a pressure differential of 125±1 Pa on a manometer, which was recorded after passing air through the foam. The porosity of the foam was measured in the direction of foam rise and, after inverting the specimen, the measurement was repeated. The air permeability is reported dm$^3$/s. Three foam slabs of 51×51×25 mm were tested and their average result was reported. Breathability ranges from zero (pneumatic foams) to fully breathable foams with airflow of 0.5 to 3 dm$^3$/s.

Viscoelastic foam Recovery Time: was measured according to the IKEA™ specification IOS-MAT-0076, with the recovery time being the time needed to regain 90% of the original foam thickness using a RESIMATT 150 device (Format Messtechnik GmbH, Karlsruhe, DE) for cubic foam pieces of 10×10×5 cm with an edge length of 150 mm. During testing the indicated foam is compressed vertically onto an adjustable reference surface. At a strain of 75%, four electro magnets clamp the pressure plate and hold it for 60 seconds. During compression a force gauge below the sample measures the restoring force. After the hold time the magnets are switched off, releasing the compression force. An ultrasonic sensor positioned right above the pressure plate continuously records the kinetics of the foam as it expands. Results are used to generate a foam thickness vs. time curve or recovery curve, plotting measured recovery wherein the difference between the indicated foam and the thickness of the untested foam of the same size. After compression and subsequent recovery, the time dependent data is displayed using the device software. The length of time a given foam deformation remains visible is plotted, and represents the area between the recovery curve and the untested foam thickness. The recovery time reported is that at which the recovery of the foam to 95% of the original height.

Resiliency: For flexible foams a ball rebound method (ASTM D 3574-11) was used to measure resiliency as a function of the rebound height of the ball after falling on the foam. The ball rebound tester was a 40±4 mm inside diameter vertical clear plastic tube into which a 16.03±0.2 mm diameter steel ball centered by a recess at the base of a magnet was released without rotation from a height of 500 mm from the bottom of the ball to the surface of the 100×100×50 mm foam piece.

Foam Hardness (ISO3386-1 2010): At least two specimens of 100×100×50 mm were tested for each system. The test machine be capable of measuring the force required to produce the specified compression with the precision of ±0.2 mm. The test specimen is supported on a smooth flat horizontal and rigid surface, larger than the test piece. The dimension of the specimen is measured before the test according to standard IS) 1923 to calculated the load bearing area (this step is automated in the instrument now) the force acts along the center line of the sample and compress it at 100±20 mm/min by means of compression plate until the compression of 70% of the initial test samples thickness is attained, The decompress the test piece at the same rate until the separation between the compression plate and the base plate is equal to the initial test piece thickness. This procedure is repeated immediately for 3 times. At the forth compression cycle the force in Newton at the specified strains (here 40%) is read. A measure of the load bearing properties of the foam was measured by compressing the whole surface area of the indicated foam and recording the stress or energy loss (hysteresis). The average result was reported in kPa.

The pH of the aqueous coating compositions in all of the examples ranged from 7.2 to 7.6. Further, the Alkyl phenol ethoxylate (APEO) level was controlled by selecting APEO free raw materials, including the soft acrylic or vinyl copolymer binder having a max APEO level of 50 ppm. In the inventive aqueous coating compositions, 35 wt. % of the binder were used which equates to a calculated max APEO level of 18 ppm.

TABLE 1

Aqueous coating composition Ingredients

| Ingredient | Composition |
| --- | --- |
| PCM 1 | Hard acrylic microencapsulated phase change material, where the core material is an organic wax, melting~29° C., median particle size 10-14 microns, 50 wt. % solids aqueous.[1] |
| PCM 2 | Hard acrylic microencapsulated phase change material, where the core material is an organic wax, melting~32° C., median particle size 10-14 microns, 50 wt. % solids aqueous.[2] |
| PCM 3 | Hard acrylic microencapsulated phase change material, where the core material is an organic wax, melting~28° C., median particle size 10-12 microns, 55 wt. % solids aqueous.[3] |
| PCM 4 | Hard acrylic microencapsulated phase change material, where the core material is an organic wax, melting~26° C., median particle size 10-12 microns, 55 wt. % solids aqueous.[4] |

TABLE 1-continued

Aqueous coating composition Ingredients

| Ingredient | Composition |
|---|---|
| PCM 5 | Hard acrylic microencapsulated phase change material, where the core material is an organic wax, melting~26° C., median particle size 10-12 microns, 85 wt. % ??70%? solids cake.[5] |
| PCM 6 | Hard acrylic microencapsulated phase change material, where the core material is an organic wax, melting~35° C., median particle size 10-12 microns, 55 wt. % solids aqueous.[6] |
| Acrylic Copolymer 1 | BA(83.8%)/MMA(6.5%)/AN(6%)/MAA(2.3%)/ethylene ureido ethyl methacrylate(1.5%); Calculated Tg −38° C.; pH 7.2-8.0; 55-56 solids wt. % weight; ps = 320-370 nm[7] |
| Acrylic Copolymer 2 | pMMA/BMA emulsion copolymer having 1.6 wt. % copolymerized MAA and 1 wt. % copolymerized ethylene ureido ethyl methacrylate; pH~9.3, 55 wt. % solids, and Calculated Tg = −39° C. |
| Softener 1 | Polyethylene glycol, MW~400[9] |
| Softener 2 | Methoxy Polyethylene glycol, MW~550[10] |
| HEUR | Hydrophobically modified ethoxylated urethane nonionic associative thickener with pendant and terminal benzylamine hydrophobes, 18 wt. % solids |
| ASE | Anionic alkali-soluble emulsion (ASE) rheology modifier, contains polycarboxylate and polyethoxylated chains pH = 2.1 to 3.5, 18 wt. % solids[11] |
| Colorant 1 | Aqueous polyurethane colorant[12] |
| Colorant 2 | Aqueous polyurethane colorant[13] |

[1] CRODATHERM ME 29D PCM (Croda Intl., Snaith, Yorkshire, UK), all parameters per manufacturer;
[2] CRODATHERM 32 PCM (Croda Intl), all parameters per manufacturer;
[3] ENFINIT 28CSS-I PCM (Encapsys LLC, Appleton, WI) all parameters per manufacturer;
[4] ENFINIT 26 D PCM (Encapsys LLC), all parameters per manufacturer;
[5] ENFINIT 26 D dewatered cake (Encapsys LLC), all parameters per manufacturer;
[6] ENFINIT 35 D (Encapsys LLC), all parameters per manufacturer;
[7] Single stage aqueous gradual addition emulsion polymer, ps = GPC weight average using polyacrylic acid standards against the hydrolyzed polymer;
8. LIPACRYL MB-3640 polymer (The Dow Chemical Co., Midland, MI);
[9] CARBOWAX PEG 400 glycol (Dow);
[10] CARBOWAX MPEG 550 (Dow);
[11] ACRYSOL ASE-60 ER alkali-soluble emulsion (ASE) rheology modifier (Dow);
[12] Reactint Blue X17AB colorant (Milliken Co., Spartanburg, SC);
[13] Reactint Blue X3LV colorant (Milliken).
*Denotes comparative example.

TABLE 2

Testing of coating compositions on Foam Cut from Slabstock

| Example | 1 | 2 | 3 | 4 | 5 | 6 | 7 | 8 | 9 | 10 | C1 |
|---|---|---|---|---|---|---|---|---|---|---|---|
| Coating Composition | | | | | | | | | | | |
| Ingredient | | | | | Amount (wt.%) | | | | | | (pbw) |
| PCM 1 | | | | | 38.2 | 54.6 | | | | | 25[1] |
| PCM 2 | | | | | 16.4 | 0 | | | | | |
| PCM 3 | 38.2 | 38.2 | 38.2 | 54.6 | | | 54.7 | 54.6 | 54.5 | 54.4 | |
| PCM 4 | 6.4 | | 16.4 | | | | | | | | |
| PCM 5 | | 6.4 | | | | | | | | | |
| PCM 6 | 10 | 10 | | | | | | | | | |
| Acrylic Copolymer 1 | 35 | 35 | 35 | 35 | 35 | 35 | 35 | 35 | 35 | 35 | |
| Acrylic Copolymer 2 | | | | | | | | | | | 45 |
| Softener 1 | 10 | 10 | 10 | 10 | 10 | 10 | 10 | 10 | 10 | 10 | 5 |
| HEUR 1 | 0.3 | 0.3 | 0.3 | 0.3 | 0.3 | 0.3 | 0.2 | 0.3 | 0.4 | 0.5 | |
| ASE | | | | | | | | | | | 1 |
| Colorant 1 | 0.1 | | 0.1 | 0.1 | 0.1 | 0.1 | 0.1 | | | | |
| Test And Result | | | | | | | | | | | |
| Prolonged Freshness | 3 | 3 | 1 | 1 | 1 | 1 | 1 | 1 | 1 | 1 | 2 |
| Haptic | 3 | 3 | 3 | 1 | 3 | 1 | 1 | 1 | 1 | 1 | 2 |
| Blend Stability | 3 | 3 | 3 | 3 | 3 | 3 | 3 | 3 | 3 | 3 | NT |
| Shelf Life (month) | >6 | >6 | >6 | >6 | >6 | >6 | >6 | >6 | >6 | >6 | 1 |
| Pre-Mix (Y/N) | N | N | N | N | N | N | N | N | N | N | Y |
| Slab/Mold Compatibility | | | | | All examples work well | | | | | | NT |
| Production Ease | | | | | All examples work well | | | | | | NT |
| Viscosity (mPa * S) | 2750 | 2750 | 2750 | 2750 | 2750 | 2750 | 800 | 2750 | 3100 | 3720 | NT |
| pH | 7.6 | 7.4 | 7.4 | 7.6 | 7.2 | 7.2 | 7.3 | 7.3 | 7.4 | 7.4 | 7.4 |

NT: Not tested;
[1] PCM 1 was used as a 100 wt. % solids powder in amounts equivalent to 50 pbw wet.

As shown in Table 2, above, the aqueous coating composition of preferred Example 2 comprising an aqueous encapsulated PCM mixture of at least 10 wt. %, as solids, of the blend in the form of a cake, and the aqueous coating composition of Examples 1 to 3 and 5 having a mixture of a first aqueous encapsulated PCM 1, 3 or 6 having a melting point of from 25 to 38° C. with a second aqueous encapsulated PCM materials 2, 4 or 5 having a melting point of from 25 to 38° C. which is at least 2° C. higher or lower than the melting point of the first aqueous encapsulated PCM gave dramatically improved haptic or prolonged freshness results.

TABLE 3

Inventive examples for molded foam with skin

| Ingredient | 11 | 12 |
|---|---|---|
| Skin foam coating | | |
| PCM 3 | 38.2 | 54.6 |
| PCM 4 | 6.4 | |
| PCM 6 | 10 | |
| Acrylic Copolymer 1 | 40 | 40 |
| Softener 1 | 5 | 5 |
| HEUR 1 | 0.3 | 0.3 |
| Colorant 1 | 0.1 | 0.1 |
| Test Method and Result | | |
| Prolonged Freshness | 2 | 1 |
| Haptic | 3 | 1 |
| Blend Stability | 3 | 3 |
| Shelf Life (month) | >6 | >6 |
| Pre-Mix (Y/N) | N | N |
| Slab/Mold Compatibility | All examples pass | |
| Production Ease | All examples pass | |
| pH | 7.6 | 7.3 |

As shown in Table 3, above, aqueous coating compositions of preferred example 11 comprising a mixture of an aqueous encapsulated PCM 3 having a melting point of from 25 to 38° C. with a second aqueous encapsulated PCM materials 4 and 6 having a melting point of from 25 to 38° C. which is at least 2° C. higher or lower than the melting point of the first aqueous encapsulated PCM gave dramatically improved haptic or prolonged freshness results. All examples were shelf stable.

TABLE 4

Thermal Analysis Data

| Examples | 1 | 2 | 3 | 4 | 5 | 6 | 11 | 12 | Naked foam* |
|---|---|---|---|---|---|---|---|---|---|
| Cooling Intensity, Mean (CP max) (W · s$^{1/2}$/K · m$^2$) | 1246 | 1374 | 1091 | 1057 | 541 | 501 | 1247 | 1014 | 61 (Flat Recovery curve) (std error of 0.2 W · s$^{1/2}$/K · m$^2$) |
| Cooling half time (s) | 35 | 40 | 28 | 22 | 33 | 32 | 34 | 23 | |
| Recovery time (s) | 3.5 | — | 3.5 | — | 3.5 | — | 3.8 | 3.7 | With Skin (3.5) Without skin (3.2) |
| Hardness (at 40% compression) (kPa) | 1.3 | 1.3 | 1.3 | 1.3 | 1.2 | 1.2 | 0.5 | 0.5 | With Skin (0.45) Without skin (1.2) |
| Breathability (dm$^3$/s) | 2.0 | 2.0 | 2.0 | 2.0 | 1.7 | 1.7 | 0.1 | 0.1 | With skin (0.2) Without skin (4.5) |
| Slab Format | | | | No skin | | | | With Skin | Naked Slab |

*Denotes comparative example.

As shown Table 4, above, the aqueous coating compositions of all of the examples exhibit improved cooling intensity; however, preferred examples 1, 2, 3, 5 and 11 exhibit improved cooling intensity and acceptable cooling half time. Further, as shown in Table 4, the coating had a minor impact on foam touch quality. The recovery time of the foams after applying the coating on the surface showed less than a maximum 9% deviation compared to the same uncoated foam. Hardness of the foam showed almost no tangible change after applying the coating (a maximum 8% increase). The breathability of the coated foam was acceptable in every example.

The invention claimed is:

1. An aqueous acrylic or vinyl coating composition comprising: a soft acrylic or vinyl copolymer binder having a calculated glass transition temperature of from −75° C. to −25° C. and comprising 1.8 to 5 wt. %, based on the total weight of monomers used to make the copolymer, of an ethylenically unsaturated acid functional group containing monomer in copolymerized form, from 0.5 to 4 wt. %, based on the total weight of monomers used to make the copolymer, of an adhesion promoting ethylenically unsaturated monomer in copolymerized form; an aqueous encapsulated PCM (Phase change material) having a crosslinked acrylic shell; from 0.05 to 1.4 wt. %, based on the total weight of the aqueous coating composition, of a nonionic associative thickener; and from 3 to 15 wt. %, based on the total weight of the aqueous coating composition, of a softener,
   wherein the aqueous coating composition has a solids content of from 25 wt. % to 70 wt. %, and has a pH ranging from 7 to 8.

2. The aqueous coating composition as claimed in claim 1, wherein the adhesion promoting ethylenically unsaturated monomer in copolymerized form is an ethylene ureido functional ethyl methacrylate monomer.

3. The aqueous coating composition as claimed in claim 1, wherein the crosslinked acrylic shell in the aqueous encapsulated PCM is a copolymer comprising, in copolymerized form, one or more diethylenically unsaturated monomer.

4. The aqueous coating composition as claimed in claim 1, wherein the PCM in the aqueous encapsulated PCM comprises an organic wax.

5. The aqueous coating composition as claimed in claim 1, wherein the aqueous encapsulated PCM comprises an aqueous encapsulated PCM mixture of two or more aqueous encapsulated PCMs chosen from an aqueous PCM mixture wherein at least 10 wt. % of the aqueous PCM-mixture, as solids, is in the form of a cake, or an aqueous PCM mixture of aqueous encapsulated PCMs each having a different melting point ranging from 25 to 38° C., wherein each different melting point differs at least 1° C. from the other.

6. The aqueous coating composition as claimed in claim 1, wherein the nonionic associative thickener is a hydrophobically modified ethoxylated urethane (HEUR).

7. The aqueous coating composition as claimed in claim 6, wherein the HEUR has both pendant and end terminal hydrophobic groups.

8. The aqueous coating composition as claimed in claim 1, wherein the softener is a polyalkylene glycol having a molecular weight of from 200 to 1000.

9. The aqueous coating composition as claimed in claim 1 having a solids content of from 30 wt. % to 65 wt. % and a pH ranging from 7.2 to 7.75.

10. The aqueous coating composition as claimed in claim 1, which is substantially formaldehyde free and contain a level of alkylphenylethoxylates (APEO) s of less than 50 ppm.

11. A substrate coated with the aqueous coating composition of claim 1, wherein the substrate is a viscoelastic foam.

\* \* \* \* \*